United States Patent
Komi et al.

(10) Patent No.: US 7,894,146 B2
(45) Date of Patent: Feb. 22, 2011

(54) METHOD AND STRUCTURE FOR MOUNTING AN OPTICAL LENS

(75) Inventors: Satoshi Komi, Saitama Pref. (JP); Tohru Takahashi, Kawaguchi (JP)

(73) Assignees: Optoelectronics Co., Ltd., Saitama Pref. (JP); Opticon, Inc., Orangeburg, NY (US)

( * ) Notice: Subject to any disclaimer, the term of this patent is extended or adjusted under 35 U.S.C. 154(b) by 0 days.

(21) Appl. No.: 12/844,002

(22) Filed: Jul. 27, 2010

(65) Prior Publication Data

US 2010/0302656 A1  Dec. 2, 2010

Related U.S. Application Data

(63) Continuation of application No. PCT/US2008/053811, filed on Feb. 13, 2008.

(51) Int. Cl.
*G02B 7/02* (2006.01)
*G03B 21/14* (2006.01)

(52) U.S. Cl. ............ 359/819; 359/811; 359/820; 359/829; 353/100

(58) Field of Classification Search .......... 359/811, 359/819, 820, 205, 207, 503, 609, 829, 679, 359/726, 718, 719; 313/371, 385, 478; 353/100, 353/101; 348/294, 325, 335, 340; 385/31; 372/36, 101, 108, 109; 250/216, 227.2, 239; 219/121.6
See application file for complete search history.

(56) References Cited

U.S. PATENT DOCUMENTS

| | | | | |
|---|---|---|---|---|
| 5,080,736 A | * | 1/1992 | Matsui .................. | 156/64 |
| 5,377,038 A | * | 12/1994 | Uzuki et al. .......... | 359/205.1 |
| 5,400,072 A | * | 3/1995 | Izumi et al. .......... | 348/335 |
| 5,581,391 A | * | 12/1996 | Uzuki et al. .......... | 359/205.1 |
| 5,673,083 A | * | 9/1997 | Izumi et al. .......... | 348/340 |
| 6,501,605 B2 | * | 12/2002 | Moriya ................. | 359/819 |
| 6,876,789 B2 | * | 4/2005 | Kagami et al. ........ | 385/31 |
| 6,928,100 B2 | * | 8/2005 | Sato et al. ............ | 372/109 |
| 7,358,483 B2 | * | 4/2008 | Mitsugi et al. ........ | 250/239 |

(Continued)

OTHER PUBLICATIONS

International Search Report and Written Opinion, dated Jul. 14, 2008, of International Application No. PCT/US08/53811, filed: Feb. 13, 2008.

(Continued)

*Primary Examiner*—Loha Ben
(74) *Attorney, Agent, or Firm*—Kaplan Gilman & Pergament LLP

(57) ABSTRACT

A liquid lens is mounted in a lens opening provided in a photographic instrument by making use of a mounting member made of a material which transmits light of predetermined wavelength and includes an inner wall shaped and dimensioned to receive the periphery of the lens in spaced, opposed relationship. The mounting member includes a portion mounted or to be mounted to the optical instrument. A bonding material is provided between the lens periphery and the mounting member wall, and the bonding material is activated by exposure to light of the predetermined wavelength, which is injected from outside, through the mounting member. Preferably, the light is injected with a guide member having an opening with an interior wall shaped and dimensioned to conform to an exterior wall of the guide member. The light may be injected from an edge of the guide member remote from the opening, through the guide member, and into the mounting member.

17 Claims, 2 Drawing Sheets

U.S. PATENT DOCUMENTS 7,433,136 B2 * 10/2008 Ichikawa et al. ............ 359/811
7,684,132 B2 * 3/2010 Watanabe ................... 359/819
2005/0243443 A1 11/2005 Yamamoto et al.
2007/0263962 A1 11/2007 Kohda et al.

OTHER PUBLICATIONS

International Preliminary Report on Patentability, dated Aug. 17, 2010, of International Application No. PCT/US08/53811, filed: Feb. 13, 2008.

* cited by examiner

METHOD AND STRUCTURE FOR MOUNTING AN OPTICAL LENS

This application is a continuation of International Application No. PCT/US08/53811, filed Feb. 13, 2008, which designated the United States of America and was published in English on Aug. 20, 2009 under Publication No. WO 2009/102327. This International Application is hereby incorporated by reference in its entirety.

BACKGROUND OF THE INVENTION

The present invention relates generally to a method and apparatus for mounting an optical lens in an optical device and, more particularly, relates to a method and apparatus for mounting a liquid lens.

In many instances, optical devices will be provided with a fixed focal length lens. For example, some cameras have only a fixed lens, which can be mounted to the camera body through the use of a bonding material, such as glue. FIG. 1 illustrates such a structure and a method by which a fixed focal length lens is typically mounted to the camera. The camera C is typically provided with a integral sleeve S with an inside diameter sized to receive a standard lens barrel. A lens L having that diameter is positioned in the sleeve, after which a cylindrical bead of glue G is placed inside a recessed channel on the interior surface of sleeve S, in contact with the sleeve and the lens L. Typically, UV (ultra violet) glue is utilized. Such glue needs to be exposed to ultra violet light in order to set and form a bond. It is typical to provide such ultra violet radiation U through a barrel B which is made of a material that can conduct the radiation directly to the joint from the end of the barrel. After a predetermined period of radiation, the bond is completed. This is a particularly effective process which may be used for manufacture, for example, on a production line.

Liquid lenses are becoming increasingly popular. They are a form of lens in which the focal length is varied electronically, requiring no moving parts within the lens and no complicated, multiple lens structures. Moreover, they are roughly the same size as a fixed focal length lens and are available with the same lens barrel diameters. They therefore offer an excellent choice to provide a variable focal length lens in existing cameras, or existing cameras can be readily retrofitted so as to have a variable focal length lens.

One problem presented by the use of liquid lenses is that, although they can be provided in a barrel and general size equal to a fixed focal length lens, the front portions must be of a somewhat larger diameter (see lens 10 in FIG. 2). Thus the ultraviolet radiation transmitted from the end of barrel B in FIG. 1 would be blocked by the front portion of the lens. On the other hand, if the diameter of barrel B were made large enough to clear the front portion of the lens 10, ultraviolet light emitted from the end of the barrel B would be far away from the glue G and will not be able to cure it.

Basically, it is an object of the present invention to mount a liquid lens in an existing optical instrument opening dimensioned for a fixed focal length lens utilizing an existing bonding material which is cured by light.

Moreover, it is an object of the present invention to mount a liquid lens in an existing camera opening without compromising the strength of the mounting and to do so in a manner which is reliable and convenient in use, yet relatively inexpensive.

SUMMARY OF THE INVENTION

In accordance with the present invention, a liquid lens is mounted in a lens opening provided in a photographic instrument by making use of a mounting member made of a material which transmits light of predetermined wavelength and includes an inner wall shaped and dimensioned to receive the periphery of the lens in spaced, opposed relationship. The mounting member includes a portion mounted or to be mounted to the optical instrument. A bonding material is provided between the lens periphery and the mounting member wall, and the bonding material is activated by exposure to light of the predetermined wavelength, which is injected from outside, through the mounting member. Preferably, the light is injected with a guide member having an opening with an interior wall shaped and dimensioned to conform to an exterior wall of the mounting member. The light may be injected from an edge of the guide member remote from the opening, through the guide member, and into the mounting member.

BRIEF DESCRIPTION OF THE DRAWINGS

The foregoing brief description and further objects, features, and advantage of the present invention will be understood more completely from the following detailed description of a presently preferred, but nonetheless illustrative, embodiment in accordance with the present invention, with reference being had to the accompanying drawings, in which.

DETAILED DESCRIPTION OF THE PREFERRED EMBODIMENTS

Figure 1:
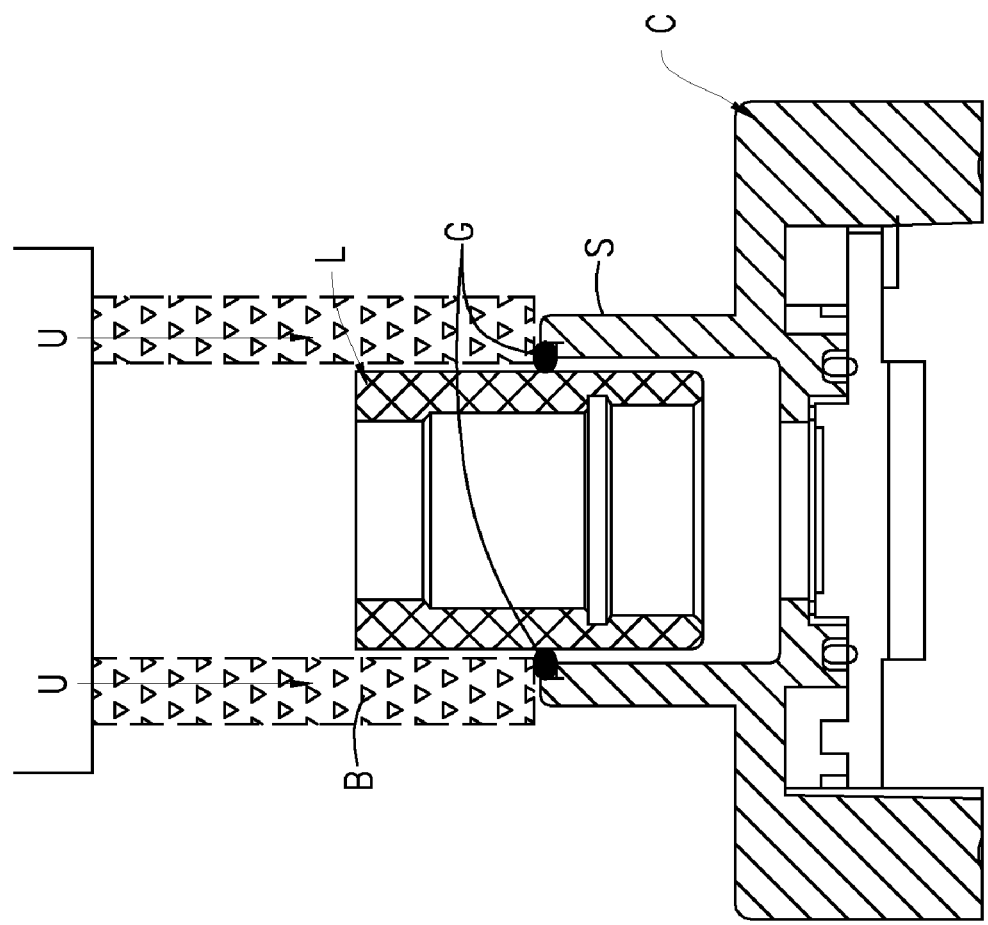
FIG. 1 is a schematic representation of a structure and method by which a fixed focal length lens is typically mounted to the camera, in accordance with the prior art.
Figure 2:
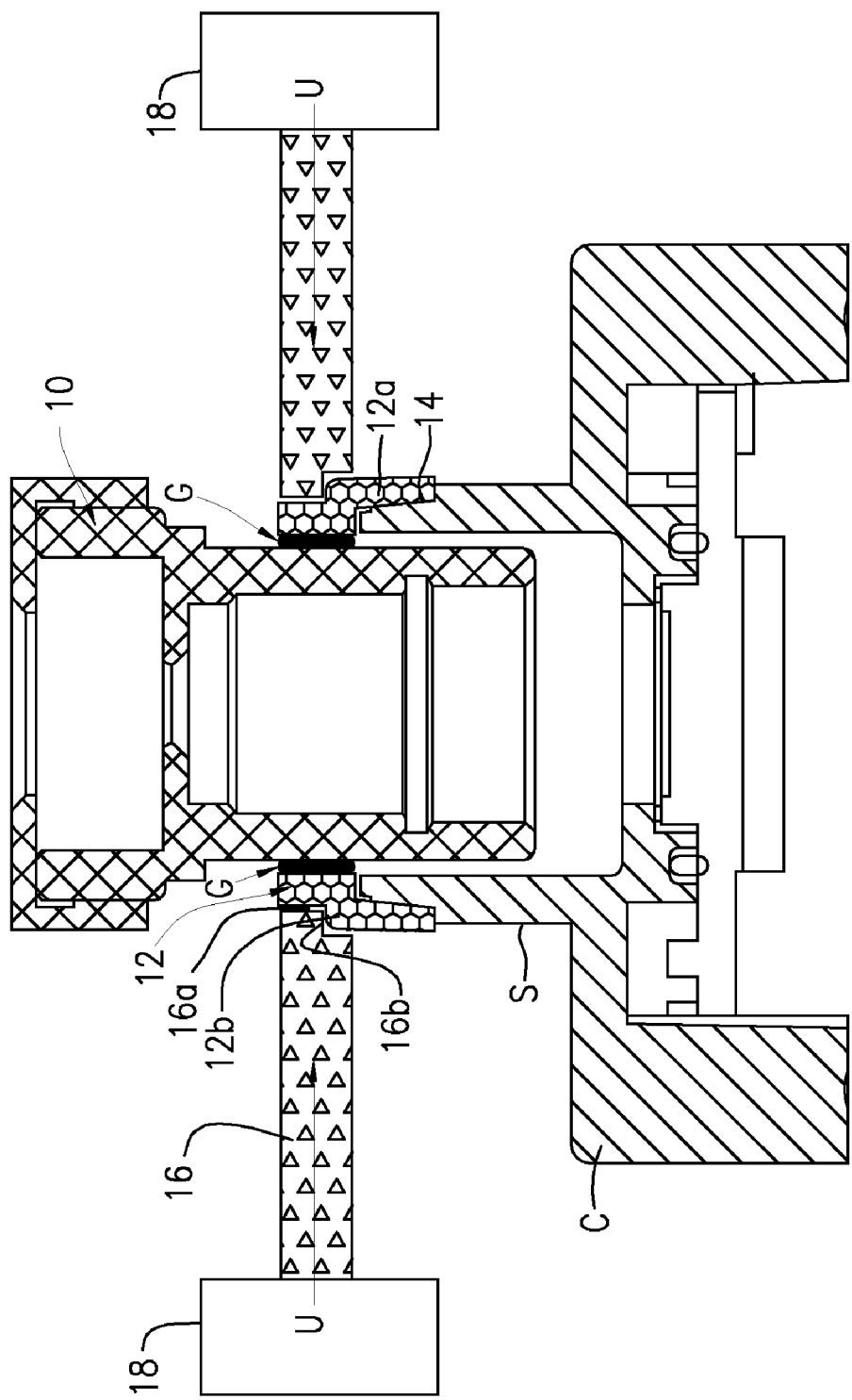
FIG. 2 is a schematic diagram, similar to FIG. 1, illustrating how a liquid lens can be mounted in the same camera opening as in FIG. 1, in accordance with an embodiment of the present invention.

FIG. 2 is a schematic diagram illustrating a lens mount and its method of manufacture, which embodies the present invention. A liquid lens (or some other form of lens having an enlarged front portion) is to be mounted in an optical device, in this case the camera C of FIG. 1. This camera has been provided with a protruding sleeve S, but those skilled in the art will appreciate that a lens can simply be mounted in an opening formed at the front of the camera.

A mounting member in the form of a ring 12 is mounted at the front of sleeve S and is dimensioned to receive the rear portion of the lens with a slight space between them. Those skilled in the art will appreciate that, in some instances, lens 10 might be mounted directly in a opening in the front of the camera, in which case ring 12 could be mounted right on the camera face. In a typical construction, lens 10 would have to be concentric with a defined optical axis, in which case sleeve S, ring 12 and lens 10 would be essentially concentric.

Ring 12 can be secured to sleeve S by any conventional means, such as bonding. In this embodiment, sleeve S is formed with an external, diametric step at its forward portion, providing a seat 14 to receive a depending skirt 12a of ring 12. Those skilled in the art will appreciate that it would be possible to bond skirt 12a to seat 14. Since skirt 12a is made of material that conducts ultra violet light, such bond can be formed with an ultraviolet bonding material. On the other hand, it might be desirable to provide mating threads or other types of connectors on seat 14 and skirt 12a so as to permit the removal of lens 10 after it has been mounted. Once lens 10 is inserted within ring 12, it is held in position, and an ultraviolet bonding material, such as glue G, is introduced in the space between them.

A thickness of material which conducts ultraviolet radiation is provided as a light guide 16. In this embodiment, guide 16 is generally disk shaped (this is not essential) and is formed with a central opening 16a shaped and dimensioned to receive the exterior surface of ring 12. In this embodiment, ring 12 is formed with an exterior step 12b and guide 16 has an opening 16a which is shaped and dimensioned to conform closely to the exterior of ring 12. It includes a step 16b conforming to the step 12b. This construction not only facilitates alignment of guide 16 with ring 12, but it provides an intimate interface between them. An air space between guide 16 and ring 12 would produce an air interface at the surfaces of guide 16 and ring 12, raising the risk of refraction, dispersion, or general loss of light intensity at those interfaces.

When ultraviolet generator 18 is activated, ultraviolet radiation U is injected radially inward, into guide 16 and towards ring 12. After a predefined period of exposure, the bonding material will be cured and guide 16 maybe removed. As a practical matter, guide 16 may be provided in two portions which are separated to facilitate removal of guide 16 after the bonding material G has set.

It should be appreciated that although FIG. 2 illustrates ring 12 already mounted to the camera C at the time that radiation is applied to material G, that need not be the case. For example the paragraph which follows describes and alternate procedure according to which the bond between lens 10 and ring 12 and the bond between ring 12 and camera C are formed at the same time.

It will be appreciated that, in the event skirt 12a and seat 14 have an ultraviolet bonding material between them, the height of guide 16 could be increased to permit it to extend down to be even with the lower extreme of skirt 12a, so that the joint between skirt 12a and seat 14 could be cured at the same time as the joint between lens 10 and ring 12.

Although the preferred embodiment utilizes a bonding material cured with ultraviolet light, it will be appreciated by those skilled in the art that a bonding material cured with any other wavelength of radiation will also be effective, provided guide 16 and ring 12 transmit that wavelength of radiation.

Although preferred embodiments of the invention have been disclosed for illustrative purposes, those skilled in the art will appreciate that many additions, modifications and substitutions are possible, without departing from the disclosed invention as defined by the accompanying claims.

What is claimed:

1. An optical lens assembly for use in an optical device having an opening for receiving an optical lens, said assembly comprising:
    said optical lens having a body portion with a periphery shaped and dimensioned to be received in the opening in the optical device;
    a mounting member made of a material which transmits light of predetermined wavelength, said mounting member including an inner wall shaped and dimensioned to receive said periphery in spaced, opposed relationship, said mounting member including a portion constructed to be mounted to a portion of the optical device; and
    a bonding material between said periphery and said mounting member inner wall, said bonding material being constructed to be activated by exposure to light of said predetermined wavelength.

2. The lens assembly of claim 1 wherein the bonding material has been activated.

3. The lens assembly of claim 1 wherein said periphery is generally cylindrical.

4. The lens assembly of claim 1 wherein said wavelength is in the ultraviolet range.

5. The lens assembly of claim 1 wherein the opening is in a raised portion of the optical device having an outer periphery, said mounting member having a mounting skirt having an inner surface shaped and dimensioned to conform generally to said outer periphery.

6. The lens assembly of claim 5, wherein said mounting member portion constructed to be mounted is on said mounting skirt.

7. The lens assembly of claim 6, wherein said mounting member portion includes bonding material being constructed to be activated by exposure to light of said predetermined wavelength.

8. The lens assembly of any one of claims 2, 3 and 5-7 wherein the bonding material is constructed to be activated by light having a wavelength in the ultraviolet range.

9. A method for mounting an optical lens to an optical device having an opening for receiving the lens, the lens having a body portion with a periphery shaped and dimensioned to be received in the opening in the optical device, said method comprising the steps of:
    positioning the body portion relative to a mounting member made of a material which transmits light of predetermined wavelength, the mounting member including an inner wall shaped and dimensioned to receive the periphery in spaced, opposed relationship, the mounting member including a portion constructed to be mounted to a portion of the optical device, the body portion and mounting member being so positioned that there is a space between the periphery and inner wall;
    introducing into the space between the periphery and inner wall a bonding material constructed to be activated by exposure to light of the predetermined wavelength; and
    injecting from outside the mounting member, through the mounting member and towards the bonding material, light of the predetermined wavelength.

10. The method of claim 9 wherein the injecting step is performed with a guide member having an opening with an interior wall shaped and dimensioned to conform to an exterior wall of the mounting member, the guide member being made of a material which transmits light of the predetermined wavelength, the light being injected from an edge of the guide member remote from the opening, through the guide member and the mounting member.

11. The method of claim 10 wherein the guide member is generally disk shaped with its opening proximate the center of the disk, the axial extent of the disk being sufficient to introduce the injected light to substantially the entire axial extent of the bonding material.

12. The method of claim 11 wherein the opening in the optical device is in an axially protruding portion of the optical device, the bonding material being positioned to be axially beyond the protruding portion when the lens is mounted to the optical device.

13. The method of claim 12, wherein the mounting member has a depending skirt which protrudes axially towards the optical device in opposed relationship to the protruding portion, the method further comprising introducing between the depending skirt and the protruding portion bonding material constructed to be activated by exposure to light of the predetermined wavelength, the guide member having an axial extent sufficient to illuminate both introductions of bonding material, the injecting step injecting light onto both introductions of bonding material, whereby the mounting member is secured to both the lens and the optical device at the same time.

14. The method of claim 9 wherein the mounting member portion which is constructed to be mounted is already mounted to the optical device at the time that the introducing step is performed.

15. The method of claim 14 wherein the injecting step is performed with a guide member having an opening with an interior wall shaped and dimensioned to conform to an exterior wall of the mounting member, the guide member being made of a material which transmits light of the predetermined wavelength, the light being injected from an edge of the guide member remote from the opening, through the guide member and into the mounting member.

16. The method of claim 15 wherein the guide member is generally disk shaped with its opening proximate the center of the disk, the axial extent of the disk being sufficient to introduce the injected light to substantially the entire axial extent of the bonding material.

17. The method of claim 16 wherein the opening in the optical device is in an axially protruding portion of the optical device, the bonding material being positioned to be axially beyond the protruding portion when the lens is mounted to the optical device.

* * * * *